United States Patent
Studerus et al.

(10) Patent No.: US 11,577,266 B2
(45) Date of Patent: Feb. 14, 2023

(54) POWDER COATING PLANT FOR COATING A WORKPIECE WITH COATING POWDER

(71) Applicant: Wagner International AG, Altstatten (CH)

(72) Inventors: Patrik Studerus, Steinach (CH); Reinhard Haller, Ravensburg (DE); Eugen Loos, Friedrichshafen (DE); Ruslan Schmidt, Friedrichshafen-Kluftern (DE)

(73) Assignee: Wagner International AG, Altstätten (CH)

( * ) Notice: Subject to any disclaimer, the term of this patent is extended or adjusted under 35 U.S.C. 154(b) by 0 days.

(21) Appl. No.: 16/650,081

(22) PCT Filed: Sep. 6, 2018

(86) PCT No.: PCT/EP2018/025231
§ 371 (c)(1),
(2) Date: Mar. 24, 2020

(87) PCT Pub. No.: WO2019/063125
PCT Pub. Date: Apr. 4, 2019

(65) Prior Publication Data
US 2020/0269269 A1   Aug. 27, 2020

(30) Foreign Application Priority Data
Sep. 26, 2017   (EP) .................................. 17020442

(51) Int. Cl.
*B05B 14/48*   (2018.01)
*B05B 15/70*   (2018.01)
(Continued)

(52) U.S. Cl.
CPC .............. *B05B 14/48* (2018.02); *B05B 5/032* (2013.01); *B05B 13/0235* (2013.01);
(Continued)

(58) Field of Classification Search
None
See application file for complete search history.

(56) References Cited

U.S. PATENT DOCUMENTS 3,476,082 A * 11/1969 Cowles .................. B05B 16/95
                                                       118/635
4,864,965 A *  9/1989 Okuda .................... B05B 16/00
                                                       118/323
(Continued)

FOREIGN PATENT DOCUMENTS

DE        19819963 A1    11/1999
DE        103 59 280 A1   7/2005
(Continued)

OTHER PUBLICATIONS

International Search Report for corresponding Application No. PCT/EP2018/025231, dated Nov. 23, 2018.
(Continued)

*Primary Examiner* — Binu Thomas
(74) *Attorney, Agent, or Firm* — Renner, Otto, Boisselle & Sklar, LLP

(57) ABSTRACT

A powder coating plant for coating a workpiece with coating powder includes a booth, which receives the workpiece delivered via a floor conveyor. In addition, the powder coating plant has an upper spray applicator arrangement for spraying coating powder downward, and a lower spray applicator arrangement for spraying coating powder upward. The upper and the lower spray applicator arrangement are thereby oriented toward the same workpiece. In addition, a manipulator is provided, to which the upper and the lower spray applicator arrangement is fastened. The manipulator is formed such that the spray applicator arrangements can be moved at least in the transport direction of the workpiece by the manipulator.

18 Claims, 8 Drawing Sheets

(51) Int. Cl.
*B05B 16/00* (2018.01)
*B05B 5/03* (2006.01)
*B05B 13/02* (2006.01)
*B05B 13/04* (2006.01)
*B05B 14/45* (2018.01)

(52) U.S. Cl.
CPC ........ *B05B 13/041* (2013.01); *B05B 13/0442* (2013.01); *B05B 13/0447* (2013.01); *B05B 14/45* (2018.02); *B05B 15/70* (2018.02); *B05B 16/95* (2018.02)

(56) References Cited

U.S. PATENT DOCUMENTS

| | | | |
|---|---|---|---|
| 4,977,000 A * | 12/1990 | Murayama | B05B 13/0452 118/326 |
| 5,153,034 A | 10/1992 | Telchuk et al. | |
| 5,178,679 A * | 1/1993 | Josefsson | B05B 16/95 118/309 |
| 5,296,031 A * | 3/1994 | Seiler | B05B 16/95 118/631 |
| 5,645,895 A * | 7/1997 | Murayama | B05B 13/0452 118/323 |
| 5,989,643 A * | 11/1999 | Nakagawa | B05B 13/0452 118/313 |
| 2003/0234272 A1 | 12/2003 | Lamothe | |
| 2004/0065752 A1 * | 4/2004 | Mather | B05B 13/0405 239/261 |
| 2007/0110911 A1 | 5/2007 | Steiger | |
| 2009/0130305 A1 * | 5/2009 | Von Keudell | B05B 16/40 118/309 |

FOREIGN PATENT DOCUMENTS

| | | |
|---|---|---|
| DE | 10 2010 009069 A1 | 8/2011 |
| DE | 102012214321 A1 | 5/2014 |
| EP | 1256386 A2 | 6/2008 |
| EP | 2275209 A1 | 2/2013 |
| EP | 3459642 B1 | 8/2020 |
| KR | 101282287 B1 | 7/2013 |
| WO | 200153000 A2 | 7/2001 |
| WO | 2008043490 A1 | 4/2008 |
| WO | 2013/165181 A1 | 11/2013 |

OTHER PUBLICATIONS

Dr. Mark Ross, "Robot vision, part robotics," WS 2017/18 Status: Sep. 2017, Script for Printing; cited as D14 in opposition in counterpart EP Application No. 3 469 642.
Publication of Wagner Products, C-Line: The Most Flexible Powder Coating for Wheels, Dec. 7, 2012, www.wagner-group.com/de/unser-untemehmen/news/detail/c-linie-die-flexibelsteoulverbeschichtuna-von-raedem; cited as D21 in opposition in counterpart EP Application No. 3 469 642.
Publication of Wagner Products, "C-Line The Powder Coating Solution for Wheels," Dec. 7, 2012, Publikation des Wagner Produkts „C-Linie, Dec. 7, 2017, "https://www.wagner-group.com/de/unser-untemehmen/news/detail/c-linie-die-flexibelste-pulverbeschichtung-von-raedern"; cited as D21a in opposition in counterpart EP Application No. 3 469 542.
Letter of the European Patent Office dated Sep. 13, 2022 in corresponding European Patent No. 3 469 642.
Cromodora Wheels GEMA Europe SRL; Customer Order (Kundenbestellung) dated Nov. 3, 2015; cited as D15 in opposition in counterpart EP Application No. 3 469 642.
GEMA Switzerland GmbH; Order confirmation (Bestellungsbestaetigung) dated May 13, 2015; cited as D16 in opposition in counterpart EP Application No. 3 469 642.
GEMA; Powder Coating Plant Layout dated Jun. 11, 2015; cited as D17 in opposition in counterpart EP Application No. 3 469 642.
GEMA; Delivery papers order (Lieferpapiere Bestellung) dated Mar. 7, 2015; cited as D18 in opposition in counterpart EP Application No. 3 469 642.
GEMA Europe Srl; Invoice (Rechnung) dated Jul. 3, 2015; cited as D19 in opposition in counterpart EP Application No. 3 469 642.
GEMA; Installation (inbetriebnahme) dated Jul. 16, 2015; cited as D20 in opposition in counterpart EP Application No. 3 169 642.

* cited by examiner

POWDER COATING PLANT FOR COATING A WORKPIECE WITH COATING POWDER

RELATED APPLICATIONS

This application is a national phase of International Application No. PCT/EP2018/025231 filed Sep. 6, 2018, which claims priority of European Patent Application No. 17020442.4 filed Sep. 26, 2017.

TECHNICAL FIELD

The invention relates to a powder coating plant for coating a workpiece with coating powder.

When coating workpieces with coating powder or powder in short, the latter is sprayed onto the workpiece to be coated via one or several powder spray guns or spray applicators, respectively. During the coating process, the workpiece to be coated is located inside a powder coating booth, which will in the following also be referred to in short as booth.

PRIOR ART

A spray coating device is known from the prior art DE 103 59 280 A1. The spray coating device serves to spray the front sides of vehicle rims with coating powder. The device comprises a floor conveyor comprising spindles, which are arranged one behind the other and which can be rotated by motor and on the upper receiving surface of which a respective one of the rims rests. The plant comprises four spray stations, wherein two spray guns are in each case arranged diametrically above a rim in a stationary and non-rotatable manner at each of the spray stations. The two spray guns are directed vertically downward so as to spray coating powder onto the front side of the rim located therebelow, while the spindle comprising the rim rotates around the vertical axis of rotation on the spray station. To coat the rear side of the rim, two further stationary spray guns are provided, which are directed upward. In the case of an embodiment, the floor conveyor runs intermittently, that is, it stops while the rim is coated. This has the disadvantage that the floor conveyor has to be stopped every time a rim is to be coated. After the rim has been coated, the floor conveyor has to first start up again and then stop again, as soon as the next rim has reached the coating station. In the case of another embodiment, the floor conveyor is continuously moved past the stationary spray guns, also during the coating of the rims. To be able to coat the rims with sufficient coating powder, the floor conveyor has to move extraordinarily slowly. Both embodiments have the disadvantage that the number of the rims, which can be coated per time unit, is relatively limited. Even though this can be countered in that a plurality of spray stations is used, this then has the disadvantage, however, that the installation space for the entire coating plant becomes relatively large.

SUMMARY OF THE INVENTION

It is an object of the invention to specify a powder coating plant for coating a workpiece with coating powder, in the case of which the surface area of the powder coating plant is minimized and, simultaneously, the number of the workpieces, which can be coated per time unit, is large.

In the case of the powder coating plant according to the invention, the duration for the color change is advantageously minimal.

The total energy consumption for the powder coating process can advantageously be reduced by means of the powder coating plant according to the invention. This is attained in that, among other things, the powder coating plant can manage with little energy for the extraction.

The object is solved by means of a powder coating plant for coating a workpiece with coating powder comprising the features specified in patent claim 1.

The powder coating plant according to the invention for coating a workpiece with coating powder comprises a booth, which is formed in such a way that it can receive the workpiece delivered via a floor conveyor. In addition, the powder coating plant has an upper spray applicator arrangement for spraying coating powder downward, and a lower spray applicator arrangement for spraying coating powder upward. The upper and the lower spray applicator arrangement are thereby oriented toward the same workpiece. In addition, a manipulator is provided, to which the upper and the lower spray applicator arrangement is fastened. The manipulator is formed so that the spray applicator arrangements can be moved at least in the transport direction of the workpiece by means of said manipulator.

Advantageous further developments of the invention follow from the features specified in the dependent patent claims.

In the case of an embodiment of the powder coating plant according to the invention, the booth has a manipulator opening, by means of which the lower spray applicator arrangement can be moved into the booth. In addition, a powder extraction opening is provided in the booth, which is arranged opposite the manipulator opening. A cross flow, which provides makes it possible to keep the booth clean in an efficient manner, is generated by means of this arrangement. In addition, it is attained thereby that hardly any powder can reach all the way to the booth walls and adheres there.

In the case of another embodiment of the powder coating plant according to the invention, a horizontal spray applicator arrangement is provided for horizontally spraying coating powder. The side surfaces of the workpiece can thus advantageously also be optimally coated.

In the case of a further embodiment of the powder coating plant according to the invention, the horizontal spray applicator arrangement is fastened to the manipulator and can be horizontally moved with the manipulator. It is attained thereby that more time is available for coating the workpiece.

In the case of the powder coating plant according to the invention, a rotating device can furthermore be provided for rotating the workpiece to be coated. This has the advantage that an even more consistent coating of the workpiece is possible.

The powder coating plant according to the invention can also be equipped with an electrostatic charging device for charging the coating powder. It is attained thereby that the coating powder adheres better to the workpiece to be coated. In addition, the shape of the powder cloud can be positively influenced thereby.

In the case of the powder coating plant according to the invention, the booth is advantageously shorter than 3 m. This has the advantage that the booth as a whole has a smaller construction volume. Less air per time unit has to thus be extracted from the booth, which, as a whole, leads to a lower energy demand.

In the case of the powder coating plant according to the invention, a conveying slot for the floor conveyor cab furthermore be provided in the booth floor. In addition, a blower for generating an air flow is provided. An air outlet, which orients the air flow beyond the conveying slot towards the extraction opening, is provided on the booth floor. The floor of the booth can be easily cleaned in this way. In addition, at least the lower part of the transport spindles can thus also be kept free from powder. It is also prevented that powder falls into the conveying slot and soils the floor conveyor.

In the case of a further development of the powder coating plant according to the invention, the upper spray applicator arrangement has at least one spray applicator and a drive, by means of which the spray applicator can be vertically moved. This has the advantage that the distance of the spray applicator can be automatically adapted to workpieces of different heights.

In the case of another further development of the powder coating plant according to the invention, the upper spray applicator arrangement has a further drive, by means of which the spray applicator can be horizontally moved. The upper spray applicator arrangement can be automatically adapted to different workpiece dimensions in an advantageous manner therewith. In the case of a rotationally symmetrical workpiece, the spray applicator arrangement can be adapted to the diameter of the workpiece.

In the case of an additional further development of the powder coating plant according to the invention, a blow-off device is provided, which is operable with compressed air, for blowing off the lower spray applicator of the spray applicator arrangement. The blow-off device can also be formed in such a way that it additionally serves to blow off the spray applicator of the horizontal spray applicator arrangement. The horizontal spray applicator arrangement and/or the lower spray applicator arrangement can be cleaned automatically in a simple and cost-efficient manner by means of this arrangement. The blow-off device can also be formed in such a way that the upper spray applicators can also be cleaned therewith.

In the case of the powder coating plant according to the invention, it is advantageous to provide a controller, which is formed and is operable in such a way that it moves the spray applicator arrangements synchronously with the workpiece to be coated. The dwell time, as the time period during which the workpiece is located in the area of the spray applicator arrangements, can be extended thereby.

The controller of the powder coating plant according to the invention can furthermore be formed and is operable in such a way that it adapts the positions of the spray applicator arrangements to the respective workpiece type. This has the advantage that a production with batch size one can be attained therewith.

In the case of an embodiment of the powder coating plant according to the invention, the manipulator is a robot. By using a robot, the powder coating plant can be used particularly flexibly.

In the case of a further embodiment of the powder coating plant according to the invention, a workpiece blow-off device is provided for freeing a certain area of the workpiece from the coating powder. A previous masking of the workpiece can thus be foregone.

A coating plant is furthermore proposed, which comprises two of the above-described powder coating plants. The first and the second powder coating plant are thereby arranged one behind the other with respect to the floor conveyor.

When both powder coating plants operate simultaneously (thus coat workpieces), the throughput (number of the workpieces coated per time unit) can be increased.

It is additionally possible that the first powder coating plant is supplied with a first powder (first color shade) and the second powder coating plant is supplied with a second powder (second color shade). During the coating operation, either the one or the other powder coating plant coats. If a color change is to take place, the coating process is generally stopped initially so as to be able to roughly clean that powder coating plant, which has coated the workpieces so far. The walls and the ceiling of this powder coating plant are thereby roughly cleaned and it is ensured that later, when the entire plant is in coating operation again, no residual powder (with the incorrect color shade) can reach onto the workpieces to be coated. This rough cleaning only takes up relatively little time. Afterwards, the coating process is continued with the other powder coating booth and the powder used there (other color shade). In the case of the proposed embodiment, a color change can be performed particularly quickly.

When the booths of the two powder coating plants are arranged to be slightly farther away from one another, this has the advantage that a color change can be realized particularly quickly and easily. The two booths advantageously have a distance, which is so large that when blowing off the one booth, no powder is blown into the other booth or is suctioned from the other booth, respectively. A sufficient distance between the two booths additionally ensures that no color carryover is created.

Lastly, a coating plant comprising two of the above-described powder coating plants is proposed, wherein a cyclone separator is provided for each of the powder coating plants. With an arrangement of this type, the first powder coating plant can be supplied with a first powder (first color shade) and the second powder coating plant can be supplied with a second powder (second color shade). The entire plant can be operated as described above. Due to the fact that a separate cyclone separator is provided for each of the powder coating plants, the extracted, excess powder can be recovered homogenously and can be used for coating again.

BRIEF DESCRIPTION OF THE DRAWINGS

The invention will be described in more detail below by means of several exemplary embodiments on the basis of nine figures.

DETAILED DESCRIPTION OF THE INVENTION

Figure 1:
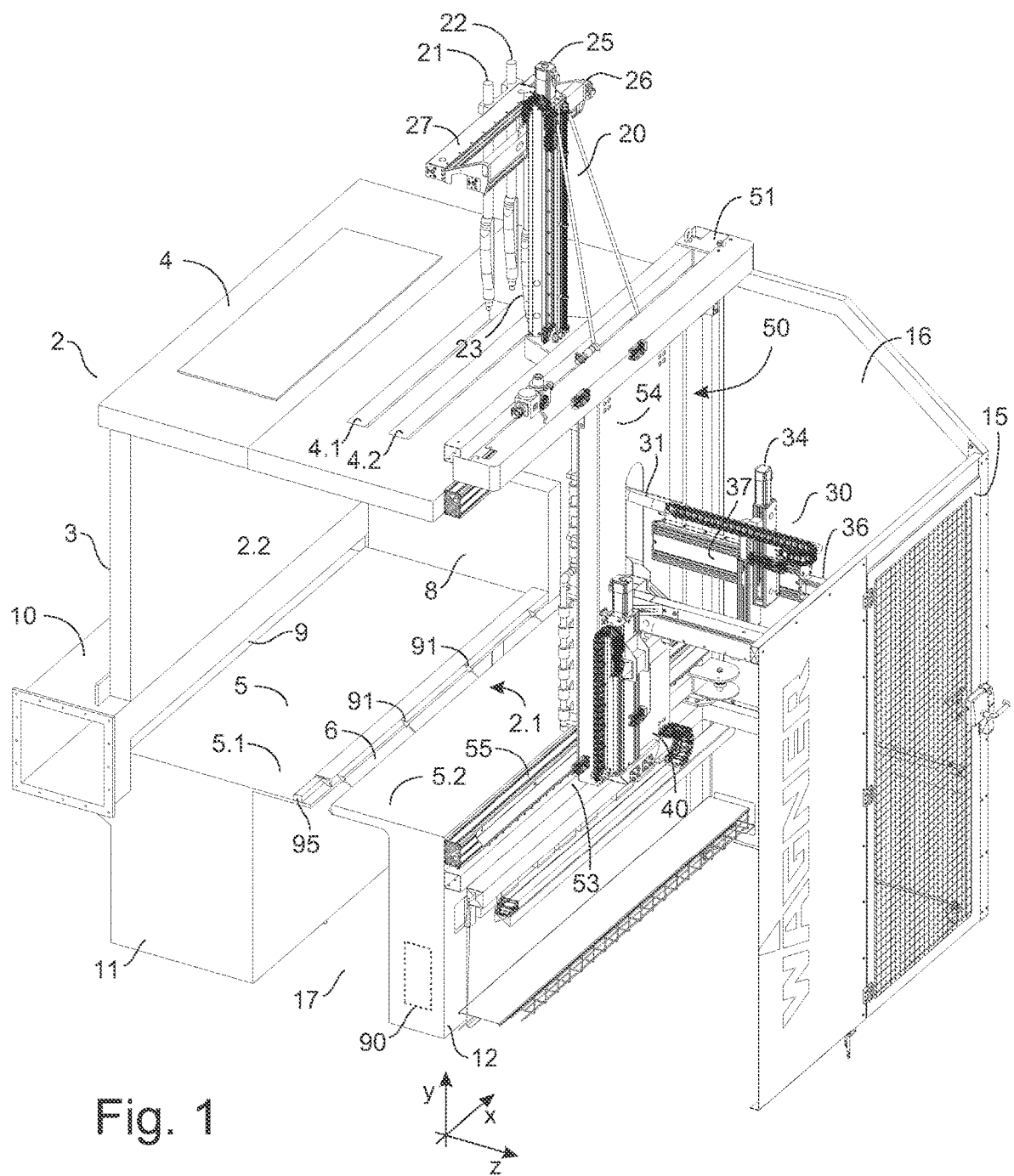
FIG. 1 shows a possible embodiment of the powder coating plant according to the invention in a three-dimensional view.
Figure 2:
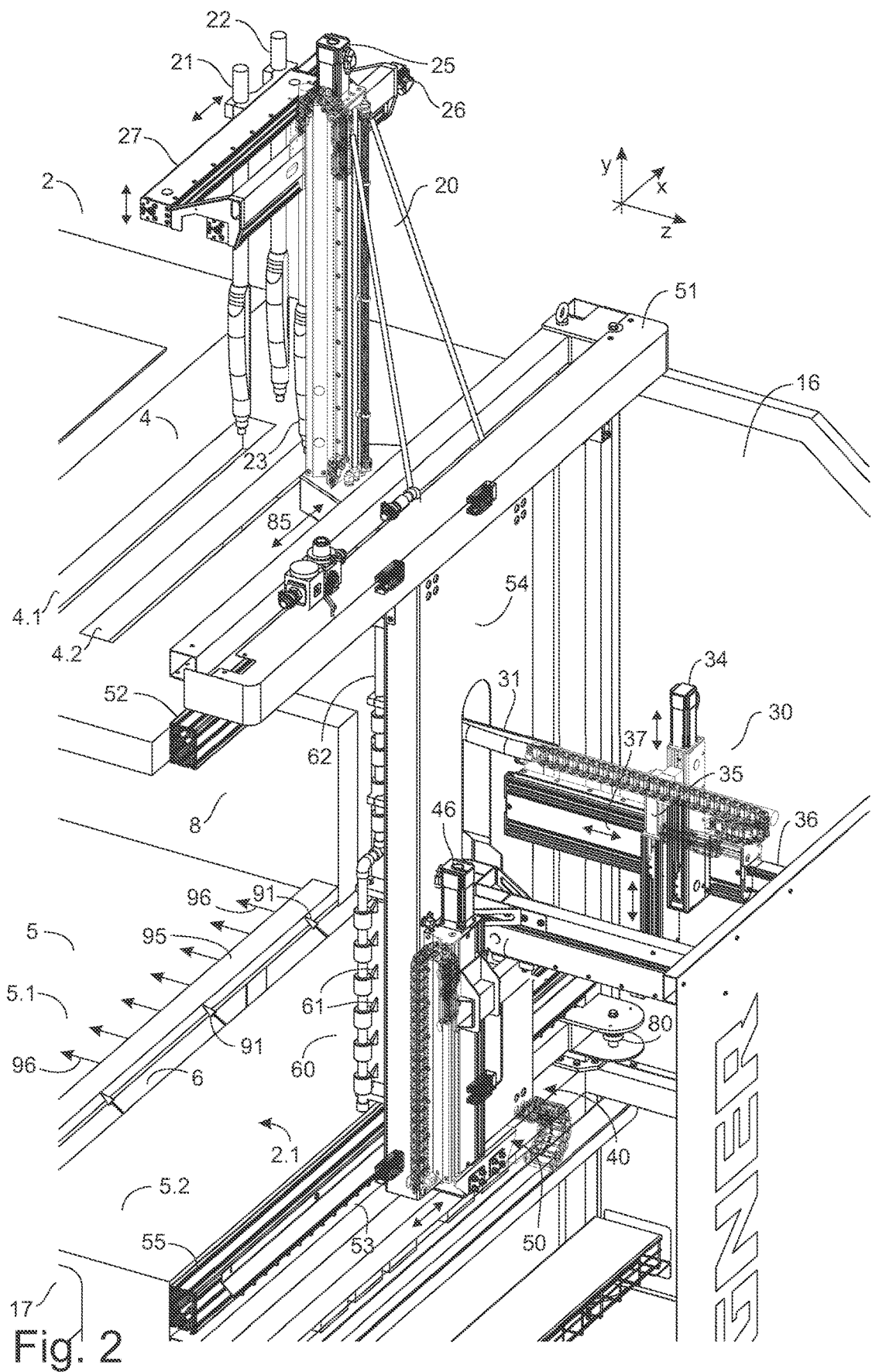
FIG. 2 shows an enlarged section of the powder coating plant according to the invention in a three-dimensional view.

A first possible embodiment of the powder coating plant according to the invention is illustrated in FIGS. 1 to 6 in different views. The powder coating booth 2 comprises a rear wall 3, a side wall 7, a side wall 8, a roof 4, a floor 5, and an opening 2.1 for a manipulator 50. The floor 5 of the booth 2 is supported by a substructure 11, 12 and is divided into a first floor section 5.1 and a second floor section 5.2. A slot 6 runs between the two floor sections 5.1 and 5.2. The slot 6 extends over the entire length of the booth 2. A floor conveyor 100 is located below the floor 5 in the space 17. The floor conveyor 100 is generally fastened to the hall floor 110. It serves to transport a workpiece 200 to and through the powder coating plant, and, after the workpiece 200 has been coated in the powder coating plant, to remove it from there again. The floor conveyor 100 is arranged below the booth floor 5, the workpiece holder 102 thereof protrudes partly through the slot 6.

The floor conveyor 100 can be equipped with a rotating device 101. The rotating device 101 is provided to allow the workpiece 200 to rotate around the longitudinal axis of the workpiece holder 102. The workpiece holder 102 is also referred to as spindle. The rotation of the workpiece 200 is illustrated symbolically in FIG. 5 by means of the curved arrow 103 around the longitudinal axis of the workpiece holder 102.

So that the floor conveyor 100 can transport the workpiece 200 into the booth 2, a corresponding opening is provided in the side wall 7 of the booth. The same applies analogously for the side wall 8. A corresponding opening for the workpiece 200 is likewise provided in said side wall.

Due to the fact that not all powder particles sprayed by the spray guns or spray applicators, respectively, adhere to the workpieces 200 to be coated, the excess powder, which is also referred to as overspray, has to be removed from the booth 2 again. On the one hand, this is necessary because the surrounding area outside of the booth needs to be kept free from powder dust. On the other hand, the risk of explosion due to the powder dust cloud floating in the booth increases, when a certain concentration of the powder in the air is exceeded. This is to be prevented. To already extract excess powder from the interior of the booth 2 during the operation additionally has the advantage that in response to a color change, the required cleaning measures take less time, because less residual powder is generally located in the booth. If the booth 2 and the extraction system were not sufficiently cleaned, an unwanted color carryover may result after a color change.

To extract the overspray from the booth 2, the booth 2 has an extraction slot 9. The extraction slot 9 can be located, for example, in the lower area, preferably close to the floor, in the rear wall 3. It connects the interior of the booth 2 to an extraction pipe 10. Excess powder is thus sucked out of the booth interior as powder-air mixture via the extraction slot 9 and the extraction pipe 10, and is supplied to a cyclone separator 130 or cyclone in short, which can be formed as mono-cyclone (see FIG. 8). The powder-air mixture flows tangentially into the cyclone 130 and helically downward in the cyclone. The powder particles are thereby pushed to the outside against the outer wall of the cyclone 130 by means of the centrifugal force resulting in response to the rotation of the powder-air flow. The powder particles are conveyed downward in the direction of the powder outlet of the cyclone and are collected there. The air, which is freed from the powder particles, is extracted via the vertical central pipe, which is located in the cyclone. The air flow cleaned in this way is frequently also supplied to an afterfilter 140, so as to also filter out the residual powder, which remained in the air. The powder recovered in the cyclone 130 can be used for coating again and can be supplied to the powder coating plant or to a powder center 120, respectively.

A blower 90 for generating an air flow 91 can be arranged in the area of the substructure 11, 12. One or several air outlets, which ensure that the air flow 91 is oriented transversely to the longitudinal direction of the slot 6 and thus towards the extraction slot 9, is located in the floor section 5.2. The air flow 91 ensures that, among other things, no or only very little powder falls into the conveying slot and soils the floor conveyor.

When the workpiece 200 to be coated is located in the booth 2, the workpiece carrier 102 protrudes through the conveying slot 6. The air flow 91 generated by the blower 90 serves the purpose, among other things, of blowing off at least the lower area of the workpiece carrier 102, so that no or only less powder adheres to it. In addition, the air flow 91 prevents that powder reaches downward through the slot 6 to the floor conveyor 100.

A blowing strip 95 can be located on the first floor section 5.1 in the vicinity of the slot 6. The blowing strip 95 is provided to free the first floor section 5.1 from excess powder by means of compressed air 96. For this purpose, the blowing strip 95 can have a row of compressed air nozzles. The compressed air nozzles of the blowing strip 95 are preferably oriented such that they blow compressed air 96 along the first floor section 5.1 in the direction of the extraction slot 9. The compressed air flow 91 can have a supporting effect thereby.

The blowing strip 95 can be arranged in the immediate vicinity of the slot 6. In the case of the embodiment shown in FIG. 1, the blowing strip 95 extends from the first side wall 7 to the second side wall 8. The blowing strip 95 can comprise several blowing strip sections, through which the compressed air L can be blown in the direction of the extraction openings 9. The blowing strip sections can be constructed in such a way that they can be operated independently of one another.

A manipulator 50, which can be moved in the longitudinal direction x of the booth 2, is arranged on the open side 2.1 of the booth 2. The manipulator 50 comprises an upper guide 51 and a lower guide 53. A guide rail 52, which, together with the upper guide 51, forms an upper linear guide, is fastened to the booth roof 4.

A lower guide rail 55, which is secured to the lower frame 12 and which forms a lower linear guide with the lower guide 53, is found approximately at the height of the booth floor 5. The upper guide 51 and the lower guide 53 are connected to a support structure 54.

A horizontal spray applicator arrangement 30 is fastened to the support structure 54. The horizontal spray applicator arrangement 30 is provided to spray coating powder essentially horizontally. For this purpose, the spray applicator arrangement 30 has one or several spray applicators 31, 32. Each of the spray applicators 31, 32 can preferably be vertically moved, thus in the y-direction, with the help of a drive 34 or 35, respectively. It can additionally be provided that the spray applicators 31 and 32 can also be horizontally moved, thus in the z-direction, into the booth and out of the booth by means of a linear drive 36.

The support structure 54 additionally has a lower spray applicator arrangement 40. The lower spray applicator arrangement 40 is provided to spray coating powder essentially upward. For this purpose, the spray applicator arrangement 40 has one or several, preferably vertically oriented spray applicators 41. Each of the spray applicators 41 can preferably be moved in the y-direction with the help of a drive 42.

An upper spray applicator arrangement 20 can be fastened above the booth 2 at the upper area of the support structure 54 of the manipulator 50. In the case of the embodiment of the powder coating plant shown in FIGS. 1 and 2, the upper spray applicator arrangement 20 comprises four vertically oriented spray applicators 21, 22, 23, and 24. The four spray applicators can be vertically moved with the help of a drive 25. Via a further drive 28, the spray applicators 21 and 22, which are fastened to the support arm 27, can be moved in the x-direction. Via an additional drive 26, the spray applicators 23 and 24, which are fastened to the support arm 27, can be moved in the x-direction. The two spray applicators 21 and 22 can thus be moved in the x-direction independently of both spray applicators 23 and 24.

Slot-shaped openings 4.1 and 4.2, through which the spray applicators 21 and 22 or 23 and 24, respectively, can be moved through the roof 4 into the interior of the booth, are provided in the roof 4 of the booth 2.

Figure 5:
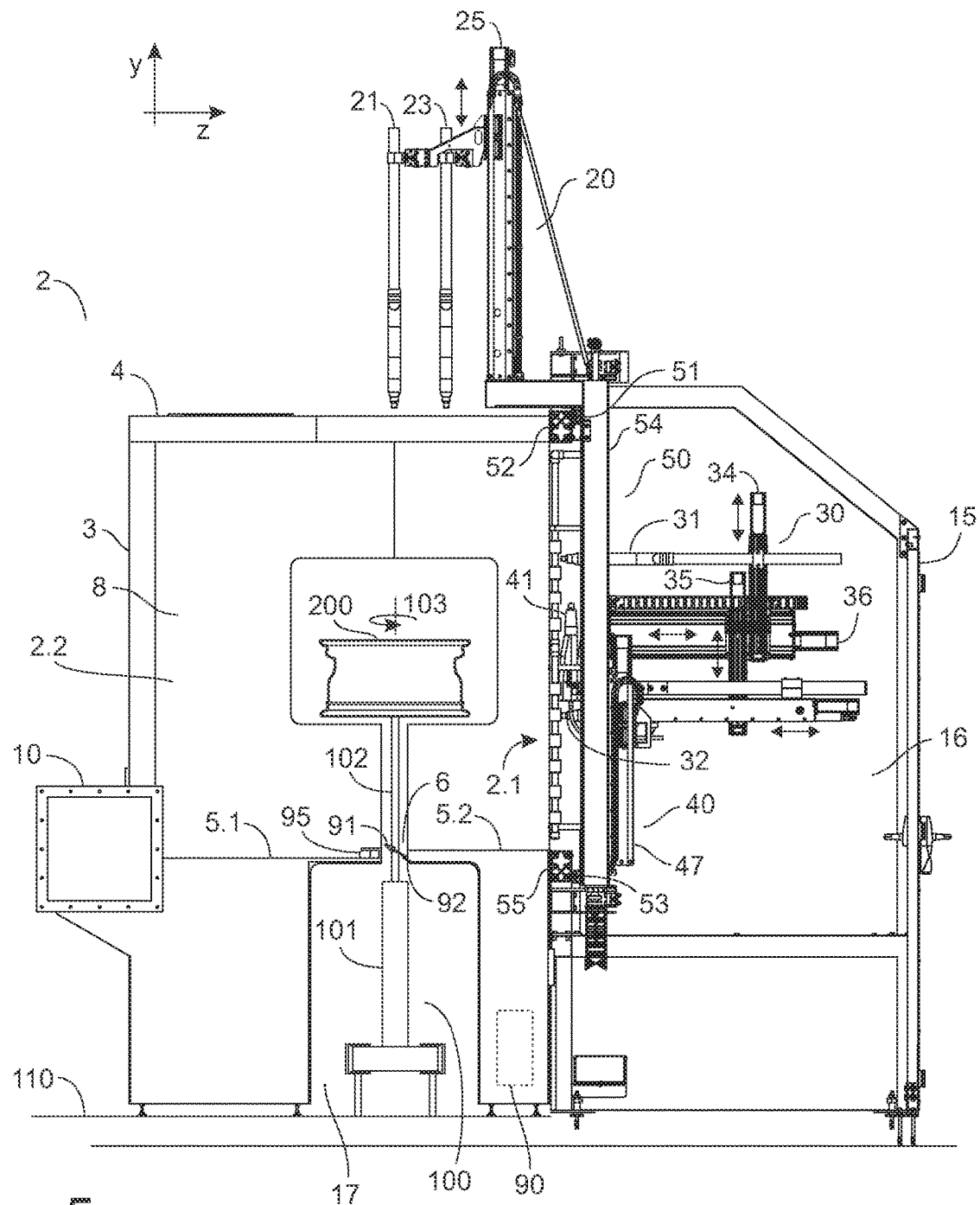
FIG. 5 shows the powder coating plant according to the invention in the side view.
Figure 6:
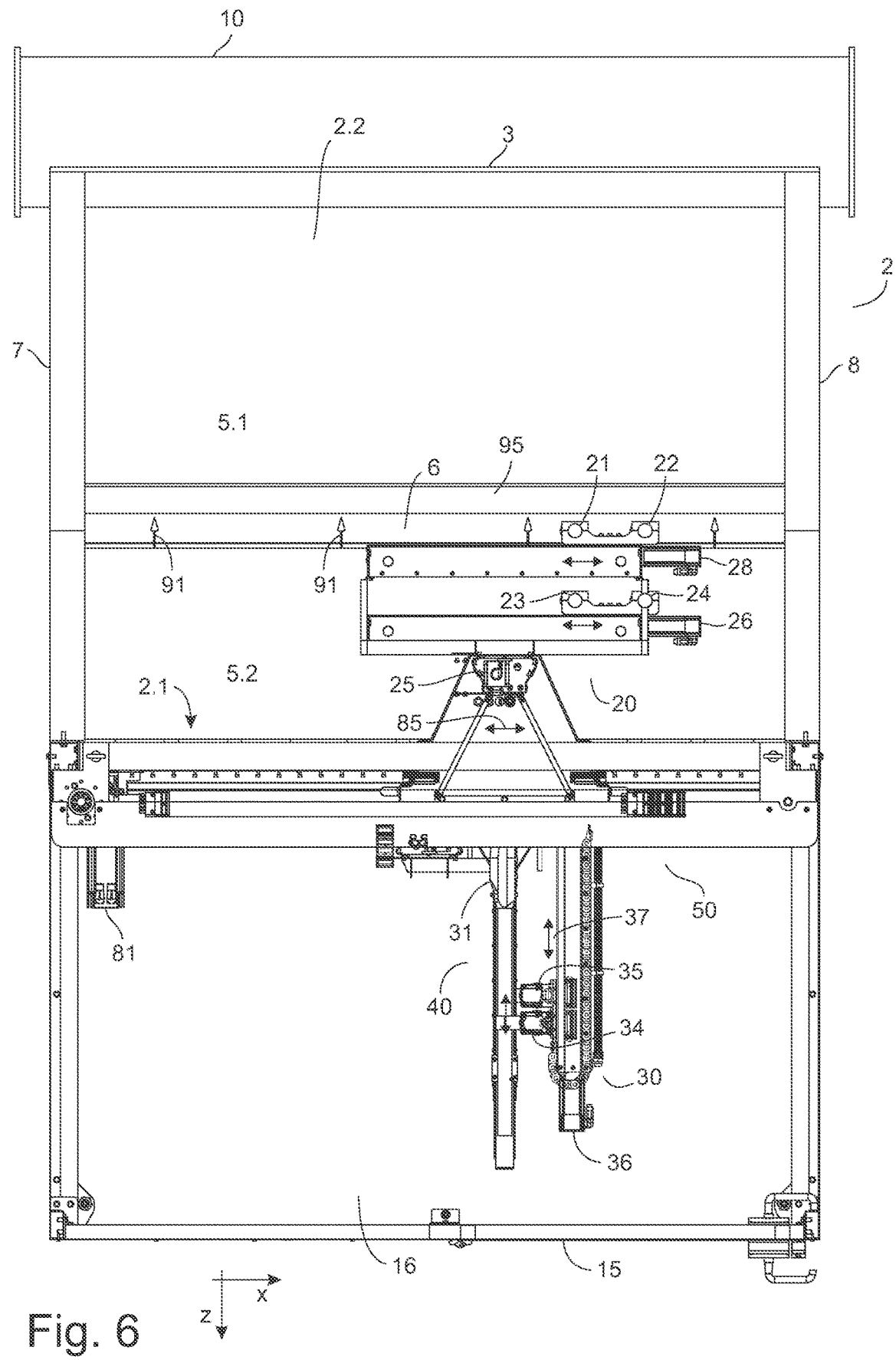
FIG. 6 shows the powder coating plant according to the invention from the top.

The number of the spray applicators, which are to be used, is a function of the respective application. If, for example, as shown in FIG. 5, the workpiece 200 is a car rim, the upper spray applicator arrangement 20 can have four spray applicators 21, 22, 23, and 24, the lower spray applicator arrangement 40 can have two spray applicators 41, and the horizontal spray applicator arrangement 30 can have two spray applicators 31, 32. Instead, it is also possible to equip the upper spray applicator arrangement 20 with only one spray applicator. It can also be provided that the lower spray applicator arrangement 40 is equipped with only one spray applicator. In an embodiment, which is preferred for the rim coating, the lower spray applicator arrangement 40 has three spray applicators.

The manipulator 50 can, for example, be moved in the x-direction with the help of a chain drive (the chain of which is not shown in the figures). Instead of the chain, a flat belt or a toothed belt can also be used. Corresponding deflection rollers 80 and a drive motor 81 can be provided at the booth 2 for this purpose. The arrow 85 symbolically characterizes the direction of movement of the manipulator 50.

Figure 3:
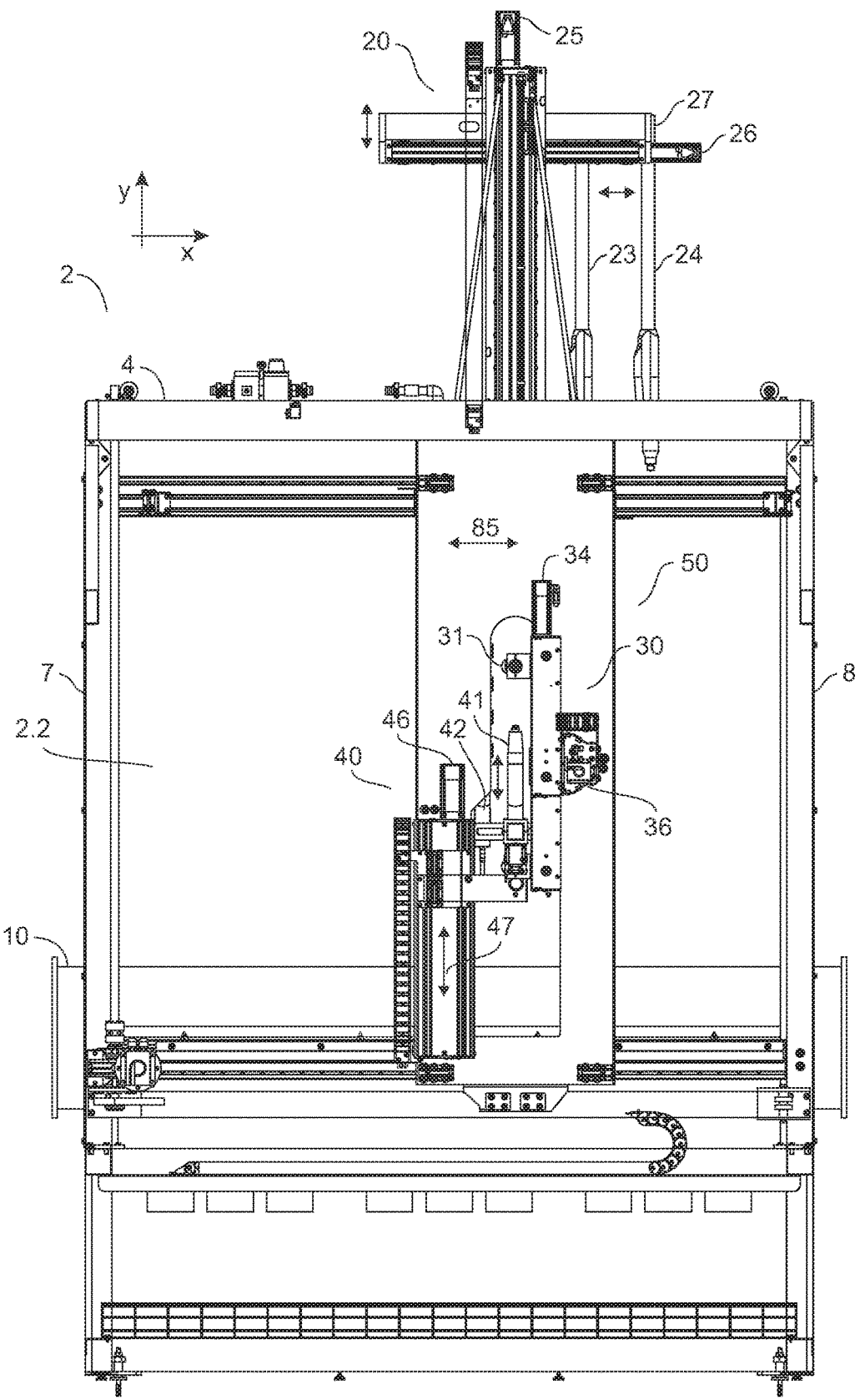
FIG. 3 shows the powder coating plant according to the invention from the front with the manipulator in a first position.
Figure 4:
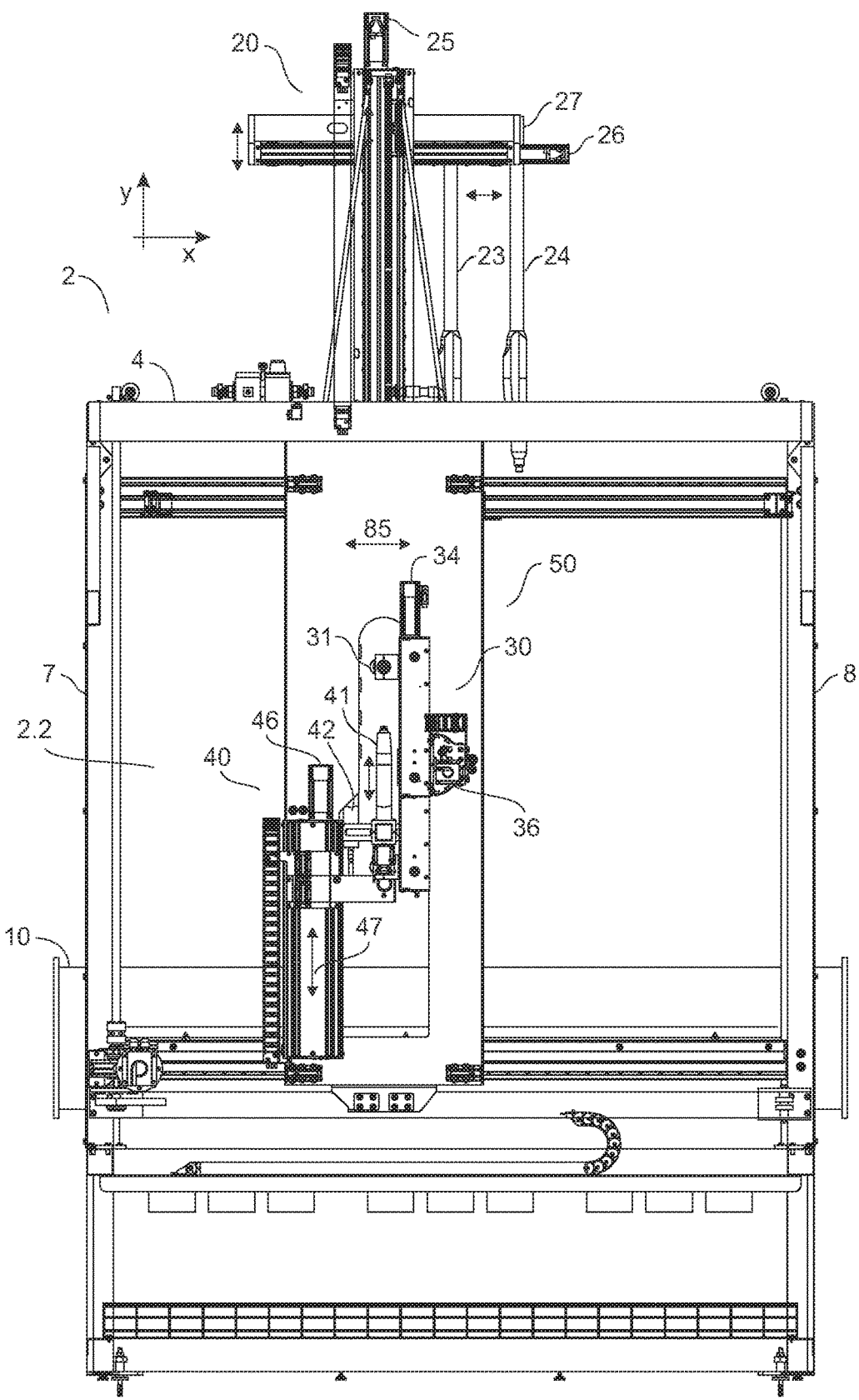
FIG. 4 shows the powder coating plant according to the invention from the front with the manipulator in a second position.

In FIG. 3, the powder coating plant according to the invention is shown from the front, whereby the manipulator 50 is in a first position. FIG. 4 shows the powder coating plant in the same view as FIG. 3, but the manipulator 50 is in a second position here. In addition to the lower spray applicator arrangement 40, the manipulator 50 also moves the horizontal spray applicator arrangement 30 and the upper spray applicator arrangement 20 in the x-direction, as can be seen from the two FIGS. 3 and 4.

In an embodiment of the powder coating plant, the anteroom 16 in front of the booth 2 is fenced off and can be accessed by the operating personnel via a door 15. For safety reasons, no operating personnel must be located in the anteroom 16 of the booth 2 while the powder coating plant automatically coats the workpieces 200. The door 15 is to be kept closed during this time.

If, for example, a car rim is coated as workpiece 200 by means of the powder coating plant, the rim is first transported from the floor conveyor 100 into the booth 2. During the coating of the rim, the floor conveyer 100 does not need to be stopped. On the contrary, it transports the car rim through the booth 2 at preferably continuous speed. While the rim is transported through the booth, the manipulator 50 preferably moves parallel to the rim at the same speed as the rim. The manipulator 50 thus preferably moves synchronously to the rim. The position of the rim in the booth 2 or the entry thereof into the booth 2, respectively, can be detected with the help of a light barrier. The speed of the floor conveyor 100 can be determined, for example, with the help of an incremental encoder. In due time, the controller 120 prompts the powder spray applicators 21-41 to assume the distances, which match the rim. Afterwards, the manipulator 50, together with the rim, moves along the booth as described above, and the spray applicators 21-41 spray powder onto the rim. The rim can thereby preferably be rotated with the help of the rotating device 101, in order to accelerate the coating process and/or to perform the coating particularly consistently.

Figure 7:
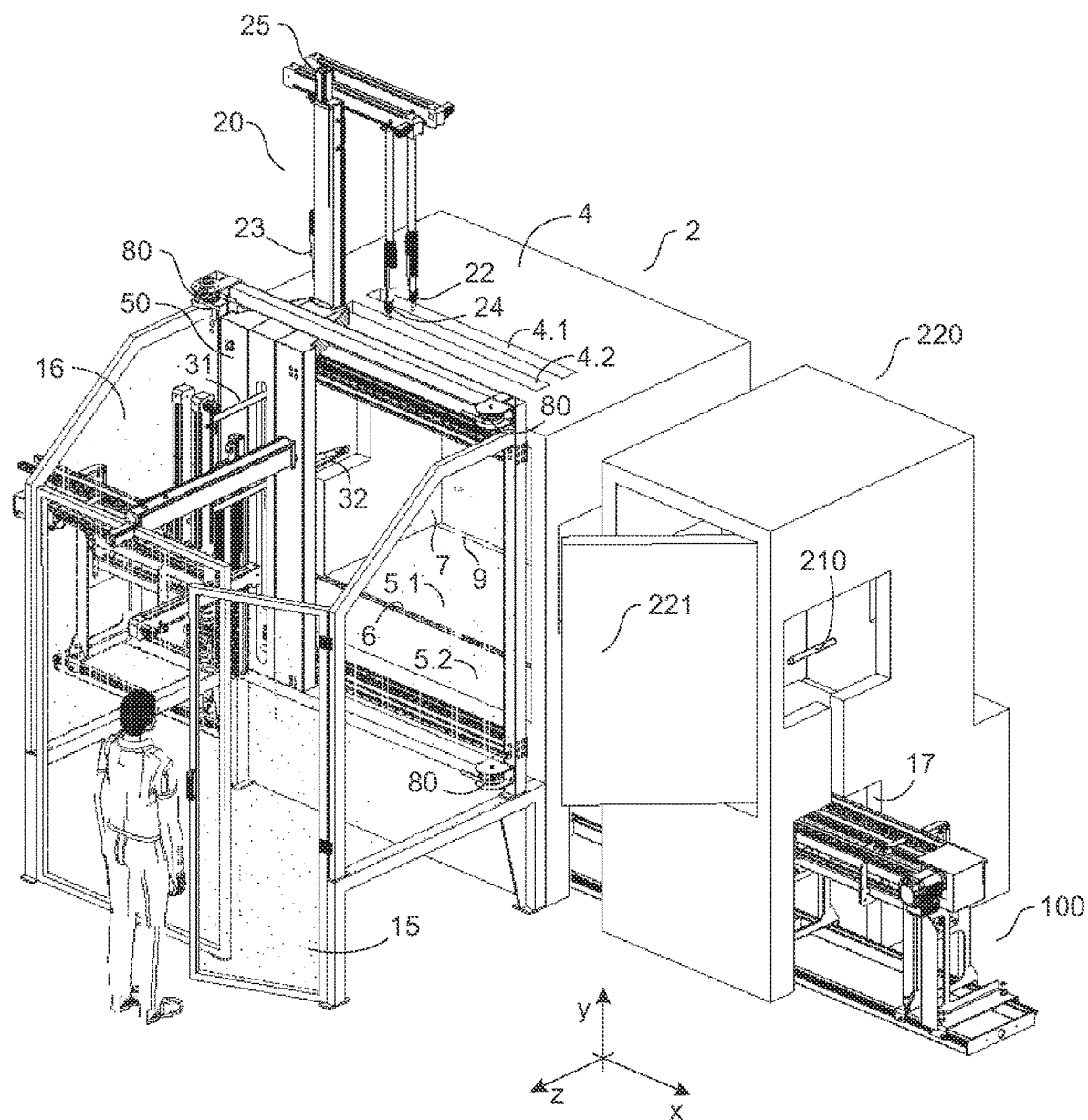
FIG. 7 shows a coating arrangement, which, in addition to the powder coating plant according to the invention, also comprises further components.

FIG. 7 shows a coating arrangement, which, in addition to the powder coating plant according to the invention, also comprises further components. Below the powder coating plant, the floor conveyor 100 runs through the powder coating plant. The booth 2 is followed by a further booth 220.

In a possible embodiment, the booth 220 has a door 221, via which the interior of the booth 220 can be accessed. Through this opening, the operating personnel can manually recoat the workpieces 200, which are automatically coated in the booth 2. The further booth 220 can be formed to be even shorter and thus smaller than the booth 2.

In a further possible embodiment, the booth 220 has a blow-off device 210 (shown symbolically in FIG. 7), which serves the purpose of partially freeing the workpiece 200, which had previously been automatically coated, from the coating powder again. If the coating plant is used to coat car rims, the rim shoulders of the rim can be freed from coating powder again with the help of the blow-off device 210.

Figure 8:
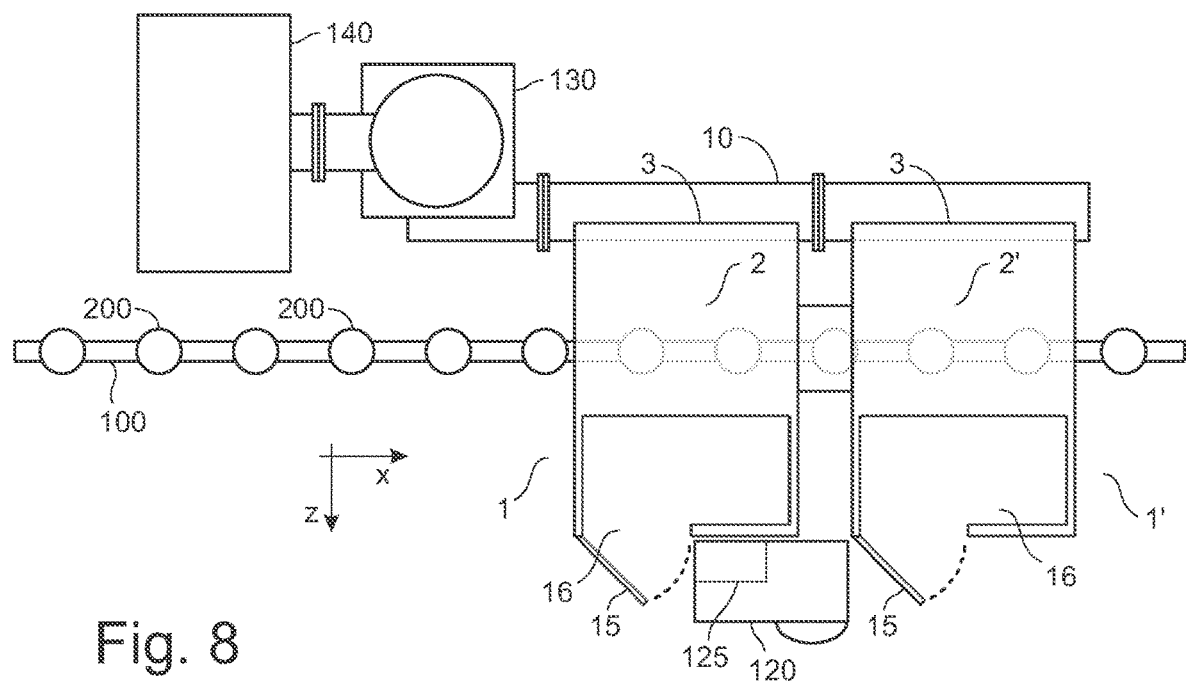
FIG. 8 shows a second coating arrangement, which comprises two of the powder coating plants according to the invention.

FIG. 8 shows a coating arrangement, which comprises two of the above-described powder coating plants. The booth 2 of the first powder coating plant 1 and the booth 2' of the second powder coating plant 1' can be structurally identical. In this case, a first manipulator 50 is located in the booth 2, and a further manipulator 50 is located in the booth 2'. The two manipulators can be controlled with the help of a controller 125. The controller 125 can be part of the powder center 120. However, it can also be accommodated in a separate control cabinet. The controller 125 can ensure that only every second workpiece 200 is coated with the first powder coating plant 1. The workpieces 200, which were not coated by the first powder coating plant 1, are coated in the second powder coating plant 1'. Both powder coating plants 1 and 1' are connected to the cyclone 130 via the extraction line 10. The cyclone 130, in turn, is connected to the afterfilter 140.

As shown in FIGS. 1 to 7, the manipulator 50 can be formed as portal robot. The portal carriage is formed essentially by the upper guide 51, the lower guide 53, and the support structure 54, and is responsible for the horizontal movement in the x-direction. The movement along the z-axis and along the y-axis is performed by portal arms. Three portal arms are shown in the figures, to which the spray applicators 21-42 are fastened. The upper spray applicator arrangement 20 is fastened to a first portal arm, the horizontal spray applicator arrangement 30 is fastened to a second portal arm, and the lower spray applicator arrangement 20 is fastened to a third portal arm. It can also be provided that, for example, the first portal arm can additionally also move in the x-direction.

The manipulator 50 cannot only have one, but several support structures 54. They can be moved in the x-direction independently of one another. The movements of the support structures 54 in the x-direction, however, are preferably synchronized relative to one another. Each of the support structure 54 can support, for example, one or several of the portal arms and thus one or several of the spray applicator arrangements 20.

It can also be provided that a manipulator 50, which is formed as single-arm robot or industrial robot, respectively, is used in the first powder coating plant. The single-arm robot is particularly well suited for coating workpieces with complicated contours and can, for example, take over the pre-coating of the workpiece.

Figure 9:
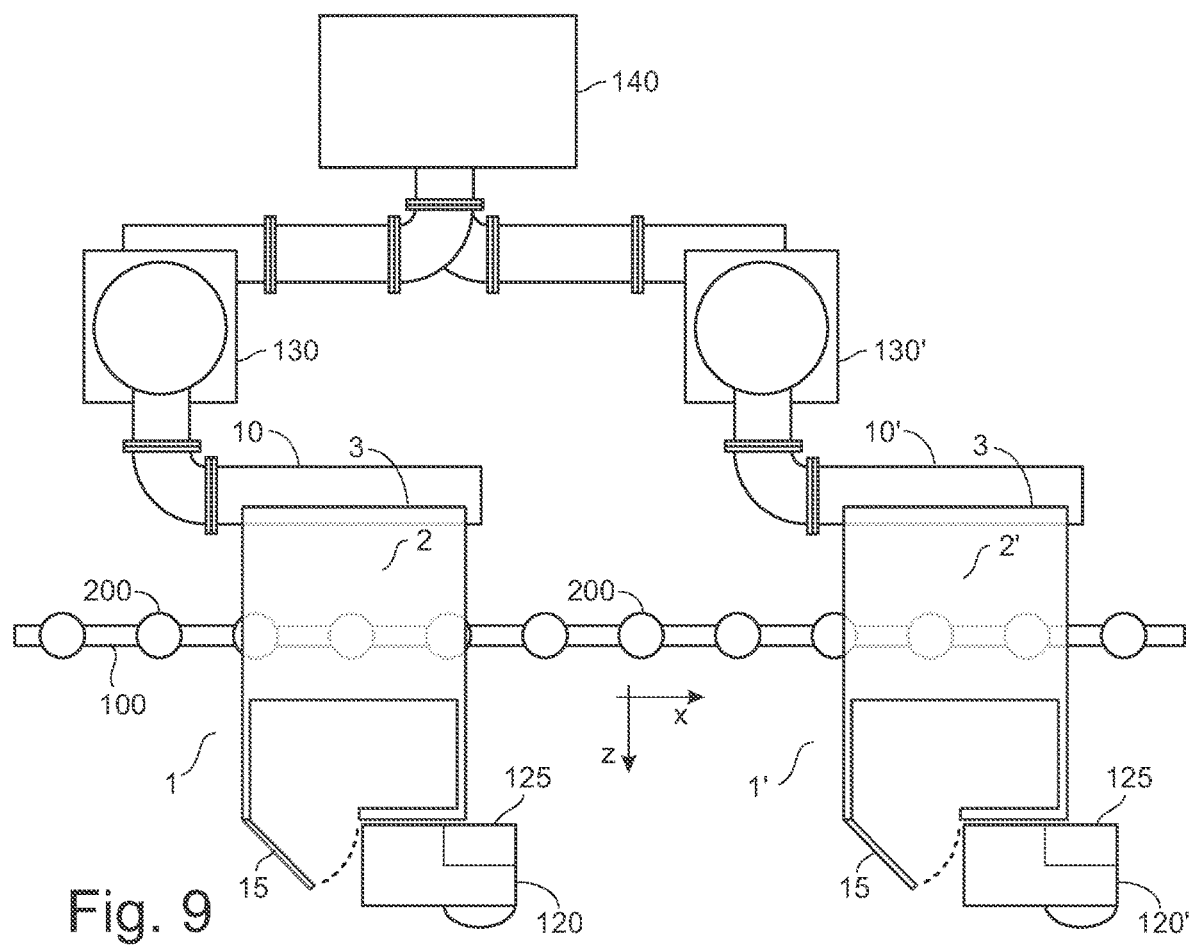
FIG. 9 shows a third coating arrangement comprising two of the powder coating plants according to the invention.

FIG. 9 shows a further coating arrangement comprising two of the powder coating plants 1 and 1' according to the invention. In the case of this embodiment, the first powder coating plant 1 is connected to a first cyclone 130 via the extraction line 10, and the second powder coating plant 1' is connected to a second cyclone 130' via the extraction line 10'. The two cyclones 130 and 130' can be structurally identical. On the outlet side, the two cyclones 130 and 130' are connected to an afterfilter 140. The first powder coating plant 1 can be operated with a first color, for example black. The second powder coating plant 1' can be operated with a different color, for example white. The powder recovered in the two cyclones 130 and 130' can be supplied again to the corresponding powder coating plant 1 or 1', respectively.

Example Two-Color System

In the case of a two-color system, the first powder coating plant 1 is supplied with a first powder with a first color shade from a first powder center 120, and the second powder coating plant 1' is supplied with a second powder with a second color shade from a second powder center 120'. During the coating operation, either the powder coating plant 1 or the powder coating plant 1' coats. If, for example, the powder coating plant 1 has coated up to now, and if a color change is to now take place, the coating process is generally stopped initially and it is ensured that a workpiece 200 is no longer present in the booths 2 and 2'. The powder coating plant 1 is now roughly cleaned. The walls 3, 7, 8, and the ceiling 4 of the powder coating plant 1 are thereby roughly cleaned and it is ensured that later, when the entire plant is in coating operation again, no residual powder (with the incorrect color shade) can reach onto the workpieces to be coated. Afterwards, the coating process is continued with the second powder coating booth 1' and the second powder with the second color shade used there.

Example Single-Color System

In the case of a single-color system, the first powder coating plant 1 is supplied with the same powder as the second powder coating plant 1' from a common powder center 120. During the coating operation, both powder coating plants 1 and 1' coat simultaneously. If a color change is to take place, the coating process is stopped initially and it is ensured that a workpiece 200 is no longer present in the booths 2 and 2'. Both powder coating plants 1 and 1' are now cleaned to such an extent that no color carryover appears in response to the subsequent coating with a different color shade.

It is also possible to design the process of the color change in such a way that, prior to the beginning of the booth cleaning, preparations can be made at the powder center 120, while one of the powder coating plants 1 or 1', respectively, is still in the process of coating. It is additionally possible to design the process of the color change in such a way that subsequent work can also be performed at the powder center 120, while one of the powder coating plants 1 or 1', respectively, is already coating again.

The powder coating plant 1 can furthermore also comprise the powder center 120. The controller 125 for the powder coating plant can be located, for example, in or at the powder center 120. In the present exemplary embodiment, the powder center 120, which comprises a powder supply device and frequently also a separate ventilation, stands next to the booth 2. The powder center 120 can be connected to the afterfilter 140 via an extraction line. This is advantageous in particular for cleaning the powder supply device. Via the powder center 120, powder spray applicators are supplied with powder via powder supply lines, which are not shown in the figures.

The preceding description of the exemplary embodiments according to the present invention only serves illustrative purposes. Various changes and modifications are possible within in scope of the invention. For example, the different components of the powder coating plant shown in FIGS. 1 to 9 can thus also be combined with one another in a way, which differs from the way shown in the figures.

Instead of providing one cyclone 130, 130' each for each powder coating plant 1, 1' as in FIG. 9, the entire plant can also be operated with only a single cyclone 130. In this case, the first powder coating plant 1 is connected, for example, to the cyclone 130. The second powder coating plant 1' is directly connected to the afterfilter 140 via the extraction line 10'. The second powder coating plant 1' thus operates at a loss. Workpieces 200 can thus be coated in a standard color by means of such a total plant, for example by means of the first powder coating plant 1. If necessary, the workpieces can be coated with a special color by means of the second powder coating plant 1'. It is attained with this overall setup that the standard color can be recovered and reused with the help of the cyclone 130.

It is generally also possible, however, to operate the two powder coating plants 1 and 1' completely without the two cyclones 130, 130' and to instead connect them directly to the or also to one afterfilter 140 each.

LIST OF REFERENCE NUMERALS 1 powder coating plant
1' powder coating plant
2 booth
2' booth
2.1 manipulator opening
2.2 booth interior
3 booth rear wall
4 booth ceiling
4.1 opening in the booth ceiling
4.2 opening in the booth ceiling
5 booth floor
5.1 first segment of the booth floor
5.2 second segment of the booth floor
6 slot in the booth floor
7 booth side wall
8 booth side wall
9 extraction slot
10 extraction pipe 10' extraction pipe
11 substructure
12 substructure
15 door
16 anteroom to the booth
17 room for floor conveyors
20 vertical spray applicator arrangement
21 spray applicator
22 spray applicator
23 spray applicator
24 spray applicator
25 drive
26 drive
27 support arm
28 drive
30 horizontal spray applicator arrangement
31 spray applicator
32 spray applicator
34 drive
35 drive
36 drive
37 linear guide
40 vertical spray applicator arrangement
41 spray applicator
42 spray applicator
46 drive
47 linear guide
50 manipulator
51 upper guide
52 upper guide rail
53 lower guide
54 support structure
55 lower guide rail
60 blow-off device
61 nozzle
62 line
80 deflection roller
81 drive motor
85 direction of movement
90 blower
91 air flow
92 air outlet
95 blowing strip
96 compressed air
100 floor conveyor
101 rotating device
102 workpiece holder
103 rotational movement
110 hall floor
120 powder center
120' powder center
125 controller
130 cyclone separator
130' cyclone separator
140 afterfilter
200 workpiece
210 blow-off device
220 booth
221 door

The invention claimed is:

1. A powder coating plant for coating a workpiece with coating powder, comprising:
a booth, which to receives the workpiece delivered via a floor conveyor,
an upper spray applicator arrangement provided for spraying coating powder downward,
a lower spray applicator arrangement provided for spraying coating powder upward,
the upper and the lower spray applicator arrangement being oriented toward a same workpiece, and
a manipulator to which the upper and the lower spray applicator arrangement are fastened, and by which are movable at least in a transport direction of the same workpiece;
wherein the lower spray applicator arrangement is configured to spray coating powder upward to an underside of the workpiece;
wherein the manipulator is configured to move both the upper spray applicator arrangement and the lower spray applicator arrangement together in the transport direction.

2. The powder coating plant according to claim 1, wherein the booth has a manipulator opening, through which the manipulator protrudes, and
comprising a powder extraction opening, which is arranged opposite the manipulator opening.

3. The powder coating plant according to claim 1, wherein a horizontal spray applicator arrangement is provided for horizontally spraying coating powder.

4. The powder coating plant according to claim 3, wherein the horizontal spray applicator arrangement is fastened to the manipulator and by which it is horizontally movable.

5. The powder coating plant according to claim 1, comprising a rotating device for rotating the same workpiece to be coated.

6. The powder coating plant according to claim 1, comprising an electrostatic charging device for charging the coating powder.

7. The powder coating plant according to claim 1, wherein the booth is shorter than 3 m.

8. The powder coating plant according to claim 1, comprising:
a conveying slot for the floor conveyor in a booth floor,
a blower for generating an air flow,
an air outlet, which orients the air flow beyond the conveying slot towards a powder extraction opening, on the booth floor.

9. The powder coating plant according to claim 1, wherein the upper spray applicator arrangement has at least one spray applicator and a drive, by which the at least one spray applicator is vertically movable.

10. The powder coating plant according to claim 9, wherein the upper spray applicator arrangement has a further drive, by which the at least one spray applicator is horizontally movable.

11. The powder coating plant according to claim 3, comprising a blow-off device, which is operable with compressed air, for blowing off the lower spray applicator of the spray applicator arrangement and/or for blowing off the spray applicator of the horizontal spray applicator arrangement.

12. The powder coating plant according to claim 1, comprising a controller, which is formed and is operable to move the spray applicator arrangements synchronously with the same workpiece.

13. The powder coating plant according to claim 12, wherein the controller is adapts the positions of the spray applicator arrangements to a respective workpiece type.

14. The powder coating plant according to claim 1, wherein the manipulator is a robot.

15. The powder coating plant according to claim 1, comprising a workpiece blow-off device for freeing a certain area of the same workpiece from the coating powder.

16. A coating plant comprising a first powder coating plant and a second powder coating plant according to claim 1, wherein the first and the second powder coating plant are arranged one behind the other with respect to the floor conveyor.

17. A coating plant comprising a first powder coating plant and a second powder coating plant according to claim 1, comprising a cyclone separator for each of the powder coating plants.

18. The powder coating plant according to claim 1, wherein:
the upper spray applicator arrangement has a drive by which a spray applicator is movable into and out of the booth, the manipulator is disposed outside of the booth, and the booth has a manipulator opening through which the manipulator protrudes.

* * * * *